(No Model.)
F. W. SYMMES.
COTTON PLANTER.
No. 381,964. Patented May 1, 1888.
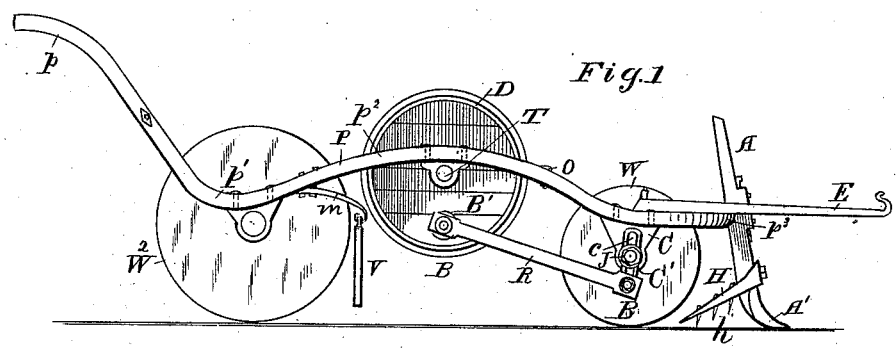
Fig. 1
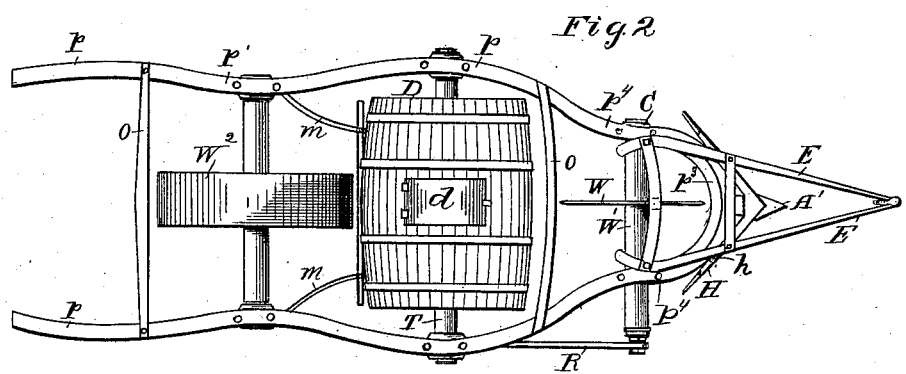
Fig. 2
Fig. 5  Fig. 3  Fig. 6
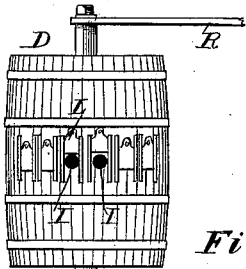
Fig. 8  Fig. 9
Fig. 7  Fig. 4  Fig. 10
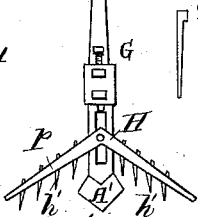
Witnesses.
J. C. Turner
B. W. Sommers
Inventor.
Frederick W. Symmes
Dimbleday & Bliss
Attorneys

UNITED STATES PATENT OFFICE.

FREDERICK W. SYMMES, OF GEORGE'S STATION, SOUTH CAROLINA.

COTTON-PLANTER.

SPECIFICATION forming part of Letters Patent No. 381,964, dated May 1, 1888.

Application filed December 23, 1887. Serial No. 258,849. (No model.)

*To all whom it may concern:*

Be it known that I, FREDERICK W. SYMMES, a citizen of the United States, residing at George's Station, in the county of Colleton and State of South Carolina, have invented certain new and useful Improvements in Cotton-Planters, of which the following is a specification, reference being had therein to the accompanying drawings.

This invention relates to improvements in planters, especially those used in the planting of cotton-seed.

It is generally customary, as is well known, to plant cotton by delivering the seed continuously from the carrying-receptacle of one form or another, and there are numerous mechanisms for effecting such continuous delivery. Then, after the plants have grown to such height as is regarded proper, the process of "chopping" is resorted to — that is to say, some of the plants are cut out of the rows—and few of those initially planted are permitted to reach maturity. It has been long recognized that this method of planting and the subsequent chopping are expensive and tedious, and even the plants that are allowed to remain are seriously injured by the treatment to which those are subjected which are removed.

The present invention has for its object to provide a simple and effective device by which the seed can originally be planted not in continuous rows, but at intervals or in hills at regular distances apart, and by which at the same time the seed can be so treated while in the machine that the delivery thereof shall be facilitated and accomplished at the proper time.

Figure 1 is a side elevation of a planter embodying my improvements. Fig. 2 is a top plan view. Fig. 3 is a bottom plan view of the barrel or seed-receptacle detached. Figs. 4 to 10, inclusive, show separately some of the details of the machine.

In the drawings, P represents the main frame of the machine, it being preferably formed of a metal bar bent to have the two handle portions $p$ $p$ at the rear, the drooping parts $p'$ $p'$ $p'$ for supporting the rear wheel, the elevated parts $p^2$ $p^2$ for supporting the seed-receptacles, the cross connecting part $p^3$ at the front end, and the parts $p^4$ behind the latter for supporting the wheel which operates the seed-delivering devices.

At the front end of the main frame is attached the draft-frame, which, as shown, consists of bars E E, which at their rear ends are secured to the main frame and at their front ends are provided with a hook and eye for receiving the clevis.

The plow or furrow-opening device is represented by A', it being carried by a plow-beam, A.

The tooth-carrying bar H is attached to the plow-beam, the arms $h$ $h$ thereof being provided with teeth $h'$, more or less similar to harrow-teeth, for the purpose of not only catching sticks, stems, and other trash, but also for pulverizing the soil, so that the machine can operate effectively and the soil shall be properly prepared for the seed.

The plow-beam and the parts carried thereby can be adjusted vertically by means of fastening devices at G.

Behind the furrow-opener or plow A', I arrange the wheel W, which is preferably a light thin metal disk. It acts not only to assist in properly forming the trench for the seed, but also assists in supporting the machine and imparts motion to the movable parts of the seed-feeding mechanism. It is mounted on a shaft, W', carried in bearings at C, depending from the main frame.

The seed-receptacle is indicated by D, it being in the construction shown of the form of a barrel—that is to say, a wooden vessel made of staves held by hoops and having heads at the ends—there being a door at $d$ for introducing the seed. To attain some of the purposes of the present invention, use may be made of any other receptacle adapted to attain the ends at which I aim; but I prefer a receptacle of the character of that illustrated, as it can be easily and cheaply made, the wooden sections or staves, the hoops, and the heads being materials which can be readily obtained. It is mounted on a shaft, T, supported, as aforesaid, on the parts $p^2$ of the main frame. This shaft T has fingers F F projecting therefrom and lying within the barrel. In the lower side of the barrel there are formed apertures I I I, each of which is provided with a sliding cover, L, adapted to close the whole or a part of the aperture. The barrel is connected by means of a pitman, R, with the shaft W' of the front wheel. It is united thereto by means of a crank-arm, C', which is provided with a slot, c, and the pin of which at B is joined to the said pitman R. At the rear end there is a wrist-pin, B', by which it is connected to the end of the barrel. At J the crank-arm C' is joined to the shaft W', and by means of the slot c the crank-arm can be adjusted so as to throw the pivot at B nearer to or farther from the axis of the shaft W', and as a result of such adjustment the movements of the said receptacle can be varied.

When the machine is in operation and the wheel W is revolving, the rear end of the pitman R is carried forward and back and imparts an oscillating motion to the receptacle.

The apertures I I are situated along a line which is an arc of a circle transverse to the shaft A. When the seed is to be delivered at short intervals, the apertures at a distance from the bottom line are closed by their respective slides and two or more of those near said line are left open; but when the seed is to be dropped at longer intervals the more distant apertures are opened and those near the bottom are shut by means of the slides L.

The fingers F F, above described, act to agitate and stir the seed, they being forced back and forth through the mass in the receptacle during the movement referred to.

Immediately behind the receptacle D is arranged the covering-board V, which operates to draw the earth over the seed after it is deposited in the furrow. This board is suspended from hangers m m, which are bolted to the main frame. Behind all of these parts is situated the wheel W², which is utilized to both support the rear part of the machine and also to pack the earth over the seed after it has been scraped into place by the board V.

The operation of the machine will be readily understood from the above description in connection with the drawings.

As ordinarily constructed, the machine will be capable of such adjustment as to permit the planting at intervals of either twelve inches in length, fourteen, sixteen, eighteen, twenty, and twenty-four inches, as circumstances may require. If the intervals are to be short, the clamping-nut at J is loosened, and the crank-arm C' is so moved as to bring the crank-pin R near the axis of shaft W', and the lower apertures I I are opened and the upper ones are closed, as described. If the planting is to be effected at longer intervals, the opposite adjustment is made.

As the machine moves along over the ground, the stubble, sticks, and trash are caught by the harrow-teeth at h and thrown out of the path of the machine, the furrow is opened by the shovel A', and the wheel W is revolved by reason of its contact with the ground, and at every revolution imparts an oscillation to the seed-receptacle. As the latter swings forward and back, the fingers F are forced through the seeds, so that the mass is kept in proper condition. At the end of the movement of the receptacle the predetermined aperture I lies at the bottom and the requisite number of seed are dropped. When the receptacle reaches the opposite end of its throw, an equal amount is dropped through the opposite aperture I. After they have been deposited in the trench, the covering-board V scrapes the earth over the seed, and the wheel W² finally packs the earth into place.

I herein make mention of the "central vertical line" of the seed-receptacle, referring to the line passing vertically through the center of the receptacle when it is normally at rest or in its central position. The seed-apertures may be regarded as comprising a row on one side of said central line and a corresponding row on the other side.

I am aware of the fact that rotating drums have been heretofore made with a row of apertures extending continuously around the periphery, and that with such drums have been combined apertured rings adapted to close more or less of all of the openings in the drum for the purpose of regulating the discharge of the seed, the size of all the apertures being varied simultaneously, and I do not claim as my invention a continuously-rotating drum having such regulating devices; but with a construction similar to that herein I can provide for planting at different distances in a way not attainable with mechanisms of the sort above referred to.

What I claim is—

1. In a planter, the combination, with a ground-wheel and the furrow-opening shovel, of the oscillating substantially cylindrical or barrel-shaped seed-receptacle having a row of seed-apertures through its periphery on one side of the central vertical line and a row of apertures on the other side of said line, the adjustable slides for the seed-apertures, respectively, and adapted to be made stationary when in operation, the agitator inclosed within the seed-receptacle, and the pitman connecting the receptacle with the said ground-wheel, substantially as set forth.

2. In a cotton-planter, the combination, with the ground-wheel and the furrow-opening shovel, of the oscillating substantially-cylindrical seed-receptacle having seed-apertures situated on arcs of circles transverse to the axis of oscillation, the slides L L, the pitman R, the slotted crank C, adjustably secured to the shaft or wheel W, and the stirring-arms F F, substantially as set forth.

3. In a planter, the combination of an oscillating substantially cylindrical or barrel-shaped seed-receptacle having closed heads and a peripheral wall formed of wooden sections bound together and to said end walls and provided with exit-apertures in the bottom on each side of the central vertical line, the upper part of the periphery being imperforate and the shaft engaging with and supporting said end walls, and the pitman for imparting oscillation to the seed-receptacle, substantially as set forth.

4. The combination, with the front and rear ground-wheels and the furrow-opening shovels, of the main frame formed, substantially as described, of the metal bar bent to provide the handle parts $p$, the depressed parts $p'$, for supporting the rear wheel, the relatively-elevated parts $p^2$, for supporting the seed-receptacle, and the forward depressed parts $p^3$, for supporting the ground-wheel and shovel, the depending bearings secured to the under side of the said frame for supporting the seed-receptacle and ground-wheels, the scraper-bars $m$, secured to said frame, and the swinging scraper or coverer V between the seed-receptacle and the rear wheel, substantially as set forth.

In testimony whereof I affix my signature in presence of two witnesses.

FREDERICK W. SYMMES.

Witnesses:
G. M. TRENHOLM,
T. B. MAXWELL.